United States Patent [19]

Jensen

[11] Patent Number: 4,954,720
[45] Date of Patent: Sep. 4, 1990

[54] METERING APPARATUS AND METHOD FOR THE MEASUREMENT OF A FIXED LENGTH OF CONTINUOUS STRAND

[75] Inventor: Thomas H. Jensen, Murrysville, Pa.

[73] Assignee: PPG Industries, Inc., Pittsburgh, Pa.

[21] Appl. No.: 460,491

[22] Filed: Jan. 3, 1990

[51] Int. Cl.$^5$ .............................................. G01V 9/04
[52] U.S. Cl. ........................................ 250/561; 57/81; 242/39
[58] Field of Search ............ 250/561; 33/707; 19/0.26; 57/81; 66/161; 139/273 A; 242/39

[56] References Cited

U.S. PATENT DOCUMENTS

| | | | |
|---|---|---|---|
| 3,068,579 | 12/1962 | Newman | 33/134 |
| 3,251,562 | 5/1966 | Petersen | 242/39 |
| 3,860,185 | 1/1975 | Makino et al. | 242/36 |
| 3,988,879 | 11/1976 | Franzolini et al. | 57/34 |
| 4,100,723 | 7/1978 | Barch et al. | 57/34 B |
| 4,217,695 | 8/1980 | Chapman et al. | 33/134 |
| 4,263,776 | 4/1981 | Lane | 57/81 |
| 4,280,322 | 7/1981 | Inger | 57/81 |
| 4,447,955 | 5/1984 | Stutz et al. | 33/129 |
| 4,526,598 | 7/1985 | Reese et al. | 65/3.1 |
| 4,715,550 | 12/1987 | Erni et al. | 242/39 |

*Primary Examiner*—David C. Nelms
*Assistant Examiner*—Que Tan Le
*Attorney, Agent, or Firm*—Richard E. Maebius

[57] ABSTRACT

This invention relates to an improved apparatus and method capable of accurately measuring fixed lengths of moving strand or yarn as it is pulled from an essentially continuous source of supply and wound onto a take-up reel by an appropriately powered winding mechanism. In its preferred embodiment, the invention is used to measure lengths of fiber glass strand unwound from forming packages and onto rotating bobbins carried on a twist-frame. Moving strand is maintained in continuous contact with a metering rim supported on an essentially frictionless layer of pressurized air thereby causing the rim to rotate. In particular, the improvement comprises means for bleeding off a portion of this pressurized air by allowing it to escape through the surface of the rim whereby any broken filaments which may break away from the strand are sloughed off from the surface of the rim before they tend to become wrapped about its circumference.

30 Claims, 3 Drawing Sheets

METERING APPARATUS AND METHOD FOR THE MEASUREMENT OF A FIXED LENGTH OF CONTINUOUS STRAND

The present invention relates to an improved metering apparatus and method for the accurate measurement of fixed lengths of textile yarn or strand wound onto a take-up reel from an essentially continuous supply source. In particular, the invention relates to an improved apparatus and method for automatically clearing the surface of the metering apparatus from broken filaments of fiber glass yarn or strand wound onto rotating bobbins from previously made forming packages also rotating on a conventional textile twist-frame.

BACKGROUND OF THE INVENTION

For quality control purposes, it is desirable that commercially sold industrial bobbins carrying strand or yarn (hereinafter referred to simply as "strand") made up from multiple individual fibers or filaments of about the same average diameter to also contain thereon the same length of strand. This insures that any variation in the length of strand supplied from a group of randomly selected bobbins is as small as possible. This is important in the manufacture of fabricated products by customers who use strand supplied on bobbins to make beams for the production of woven fabrics for example. Since several hundred bobbins may be used in making a single beam, the early run-out of one bobbin will interrupt the production process while strand supplied from a new bobbin is spliced in. Such interruptions are obviously inefficient and costly to a fabric manufacturer.

In the industrial production of textile strand, it has been a common practice to wind strand onto as many as 100 or more bobbins using a single apparatus known as a twist-frame. Each bobbin is fed from a single forming package of strand placed on an individual feed roller or creel. The creels are often driven by means of a common drive mechanism from which they may be independently disengaged so as to cease rotating. Other twist-frames may have creels that are individually driven. Likewise, the rotating bobbins may be driven individually or through a common drive train. As strand is unwound from each forming package and onto a bobbin, a twist is imparted by means of a traveler ring which also rotates about the bobbin while simultaneously traversing up and down along its length.

One method which has been used in the past to measure the length of strand wound onto the bobbin was to simply count the number of revolutions of the forming package or bobbin mechanically by an odometer-type of device. This approach, while simplistically attractive, is subject to significant errors since the effect of forming package shape and the radially increasing buildup of yarn on the bobbin is not taken into account. A second method of insuring that each bobbin carries the same length of yarn is to simply run paired forming packages and bobbins for a fixed period of time and rely upon the consistency of the strand from each forming package to produce bobbins having uniform lengths of strand thereon. Still yet, another method by which to more accurately measure the length of strand wound onto the bobbin is simply to bring the moving strand in contact with the periphery of a rotatable disc or rim of known diameter. As the strand advances, the tractive force between it and the surface of the rim will cause the rim to rotate as long as contact is maintained. Ideally, the tangential velocity of the rim will equal the lineal velocity of the advancing strand and, therefore, each revolution of the rim will measure off a length of strand equal to its circumference. By counting the number of revolutions of the rim and then multiplying by its circumference, one can theoretically determine the total length of strand advanced past the rim and onto the bobbin. This was the basic concept used in my earlier U.S. patent application Ser. No. 07/331,765 which disclosed the use of an air bearing to support a rotatable metering rim.

In the case of fine textile strands, particularly those made from a plurality of individual glass fibers, several problems must still be overcome. Usually, it is necessary to maintain a low axial tension in the strand to prevent its breakage and other adverse effects during the twisting process. Nevertheless, broken filaments are often present in the strand and they may tend to break off from it and wrap themselves about the rim, buildup about the circumference thereof, and eventually impede the rotation of the metering rim.

As will now become apparent from the remainder of this disclosure, the instant invention minimizes the aforementioned problems.

SUMMARY OF THE INVENTION

In accordance with this invention, an improved apparatus and method capable of accurately measuring fixed lengths of moving strand pulled from an essentially continuous source of supply and wound onto a take-up reel by a powered winding mechanism is provided. Measurement of the moving strand is accomplished by maintaining continuous contact between it and the surface of a lightweight, low inertia, rotatable metering rim of known diameter by partially wrapping the strand thereon. The rim is thereby caused to rotate about a stationary hub and supported on an essentially frictionless layer of pressurized air. The number of rotations are electronically counted and multiplied by the circumference of the rim. Ideally, the resulting value is equal to the total length of strand which has come in contact with the rim in order to produce the number of revolutions so counted.

In the past, the presence of broken filaments in the strand have often tended to wrap themselves about the metering surface of the rim. Eventually, this buildup of broken filaments can become so severe that the operation of the metering apparatus must be shut down so that the broken filaments can be cleaned therefrom. The instant invention bleeds off a portion of the pressurized air used to support the metering rim disclosed in my earlier application by allowing it to escape directly through a plurality of apertures provided in the surface thereof so as to slough any broken filaments away from the rotating rim. An improved device to enable the strand to be initially wrapped about the metering rim is also disclosed herein.

In one embodiment, the improved invention may be used to measure the length of strand unwound from a forming package and onto a take-up reel such as a textile bobbin by way of a twist-frame. In another embodiment, the improved invention may be used to measure the length of glass strand pulled from a fiber glass bushing and wound directly onto a rotating take-up reel such as a cardboard forming tube.

BRIEF DESCRIPTION OF THE DRAWINGS

FIG. 3 is a perspective view of the assembled measuring device shown in FIG. 2 while

DETAILED DESCRIPTION OF THE INVENTION

Figure 1:
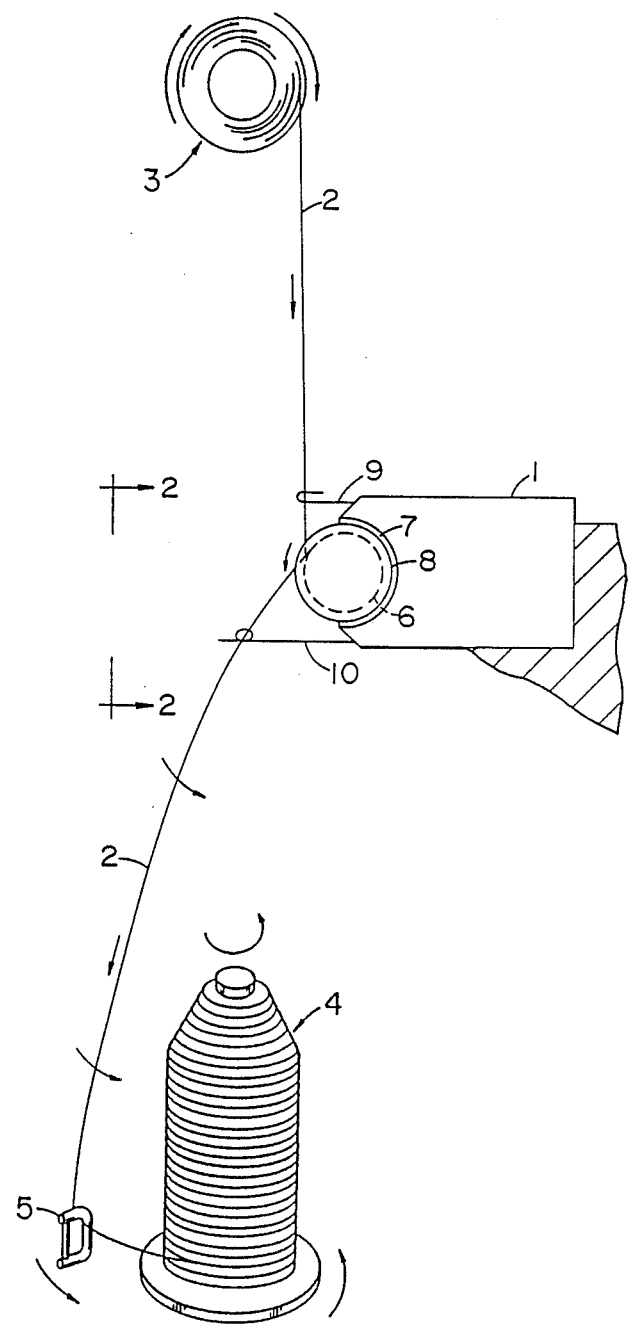
FIG. 1 shows schematically the preferred embodiment of the invention as it would be used in conjunction with a conventional textile twist-frame.

Referring now to the drawings, FIG. 1 depicts schematically the use of the present invention in its most preferred embodiment. A suitably supported measuring apparatus (1) is used to measure a length of strand (2) unwound from a rotating forming package (3) onto a bobbin (4). As the strand is unwound, a twist is imparted to it by means of a rotating traveler ring (5) as it would be done on a conventional textile twist-frame.

As the strand (2) is unwound from the supply source and onto the bobbin (5), it is brought into contact with the outer surface of a rotatable metering rim (6) housed inside the measuring apparatus (1). The strand is passed through an opening or guideway (7) and along the inside surface of a conically shaped stationary strand threading guide (8). The strand is then partially wrapped about the circumference of the metering rim (6) through a contact angle of up to about 315 degrees. This partial wrap insures continuous contact of the strand against the surface of the metering rim. At least two adjustable positioning guides (9 and 10) are also arranged such that the angle at which the strand first contacts the rim (6) and later leaves its surface can be controlled by the positioning of the guides.

Figure 2:
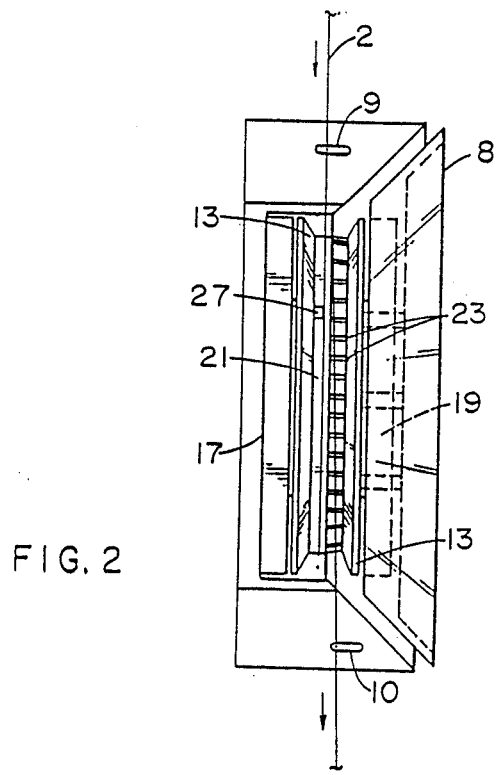
FIG. 2 shows a front elevational view of the measuring device shown in FIG. 1 taken along line 2—2.
Figure 3:
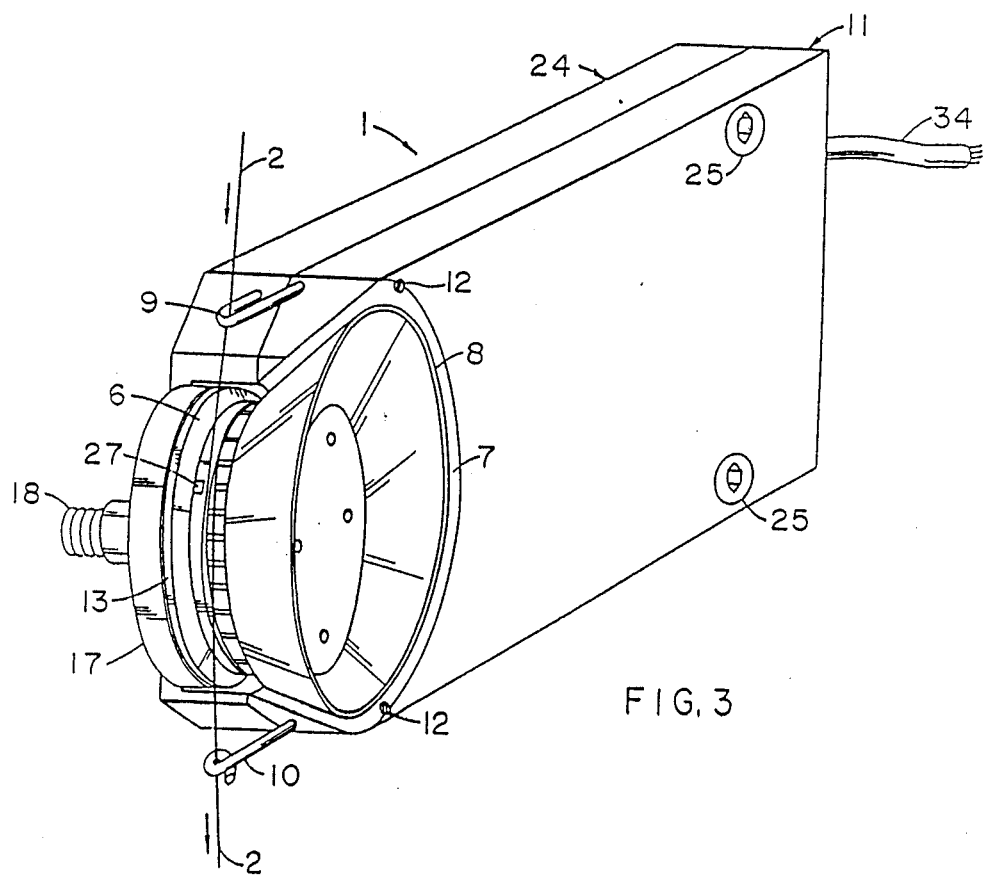
Figure 4:
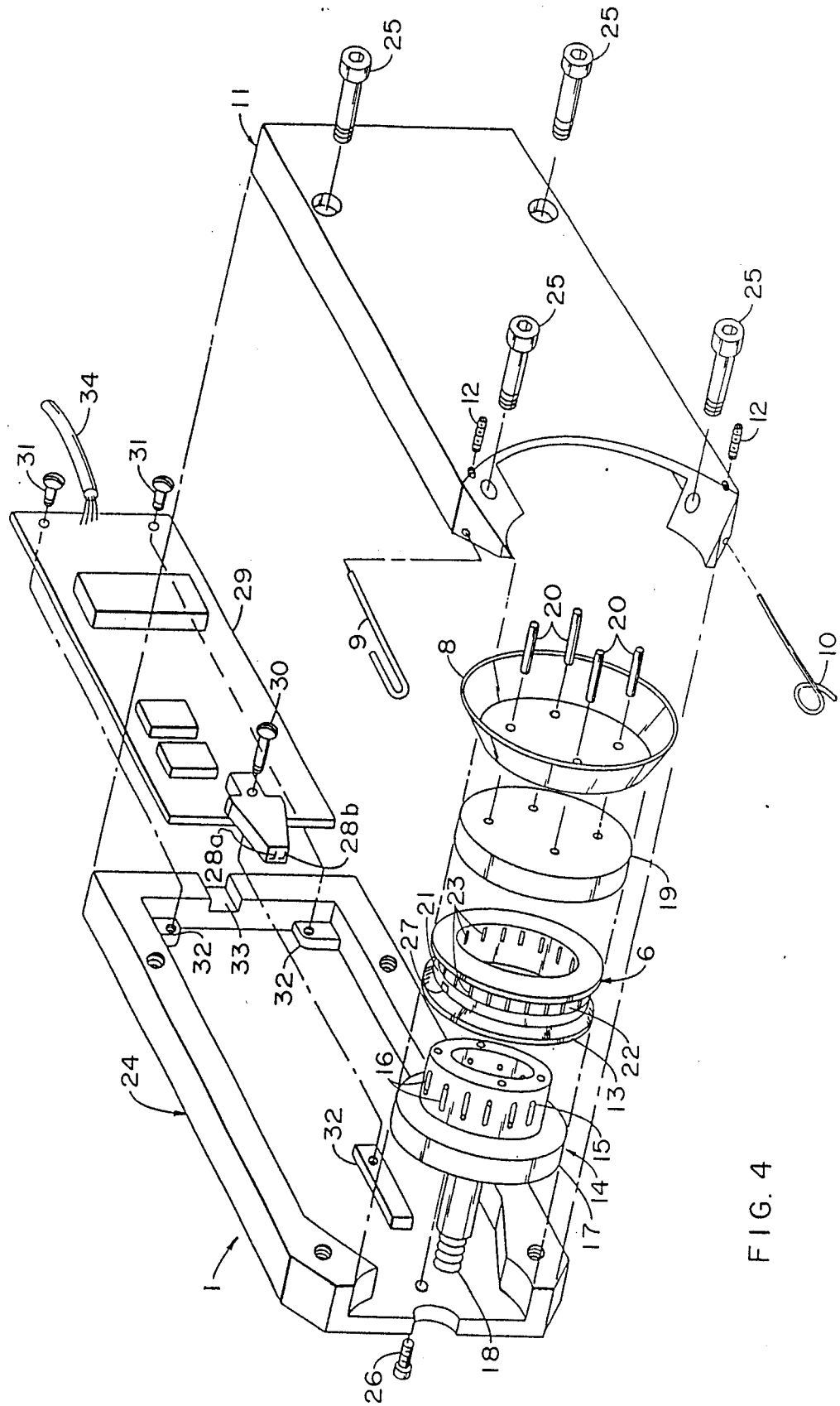
FIG. 4 presents an exploded perspective view of the measuring device showing its internal and external components.

These adjustable strand positioning guides are further illustrated in FIGS. 2–4. In the preferred embodiment, they are generally made of free machining brass although any material resistant to the cutting action of glass and which does not itself adversely affect the integrity of the strand may be used. The upper guide (9) is preferably bent backward in the shape of an elongated hook or "J" so that the strand (2) can be easily inserted. The elongated opening of the upper guide (9) allows the strand to oscillate back and forth in a plane generally perpendicular to the axis of rotation of the metering rim. The lower guide (10) is formed in the shape of a partially open circular eyelet or pigtail. This allows strand leaving the surface of the metering rim to rotate freely inside the eyelet to accommodate the "balloon" effect of the strand as it is twisted by the combined action of the traveler ring (5) and rotating bobbin (4). (This ballooning effect, well understood by those skilled in the art, describes the general shape of the strand due to the tension and centrifugal forces acting on it as it is wound onto the rapidly rotating bobbin.) This motion is also transferred to the beveled portion of the rim's surface where the strand sweeps the surface left to right.

The opposite ends of both the upper (9) and lower (10) strand positioning guides are inserted into holes located in one side of a separable housing (11), positioned, and then secured by means of a set screw, hex nut or other conventional threaded fastener (12) inserted at a right angle to guide. The exact location of guide bars may be further adjusted by bending them left or right so that the angle at which the strand (2) crosses the surface of the metering rim (6) may be further adjusted as illustrated in FIGS. 2 and 3.

The improved metering rim (6) which is further illustrated in FIG. 4, is an annular member formed from a single piece of lightweight polyvinyl chloride or other moldable, low density, rigid, and smooth plastic material by either a machining or molding process. In the preferred embodiment, the rim has raised flanges (13) at each end which extend radially outward so that a track or raceway upon which the strand may ride is formed between them as illustrated in FIG. 2.

Turning again to FIG. 4, the rim (6) is concentrically mounted over the upper annular portion of a stationary hub (14). The wall of the annulus contains a plurality of uniformly spaced bleed holes (15) of small diameter oriented toward the centerline. Although the bleed holes extend through both the interior and exterior surfaces of the annular hub, they terminate slightly below its outside surface within a grooved cavity or cross-slot (16) formed in the outer wall. The purpose of these rectangularly shaped cavities or cross-slots will be explained in further detail below. The base of the hub (17) is in the shape of a solid circular disc having an outside radius greater than that of the upper annular portion. In the preferred embodiment, the entire hub was machined from a single piece of material although the use of a hub constructed from at least two separately manufactured parts, as well as a single molded unit requiring minimal fabrication or machining, is also contemplated.

A nozzle (18) is provided through the base of the hub (17) for the injection of a substantially continuous supply of pressurized gas such as air. The nozzle can be any commercially available fitting used for injecting a pressurized source of gas. A hole drilled through the base of the hub and threaded so as to receive one end of the fitting is provided. A hose supplying pressurized gas from a supply source such as a remote compressor is then attached to the nozzle and the gas enters the interior of the annulus. This is not the only manner by which a pressurized gas can be supplied to the interior of the hub and an embodiment in which the hub and nozzle are formed as a single component is also contemplated.

A round end cap (19) is provided along with means for securing it to the face of the upper annular portion of the hub (14), the end cap having substantially the same radius as the base of the hub (17). The end cap may be secured in place by conventional threaded fasteners (20) but the use of glue, adhesives, and heat bonding is also contemplated.

A conically shaped strand threading guide (8) may also be attached by conventional fasteners to the end cap (19). This stationary threading guide has the general shape of frustum of a right conical shell of revolution and its smallest diameter is more or less equal to that of the end cap (19). The base of the threading guide may also be cupped as shown in FIG. 2 so as to partially encompass one side of the end cap. In yet another embodiment, the use of a threading guide and end cap comprising a single molded or machined component is also contemplated.

A conically shaped recess or surface is cut into one side of the housing (11) to accommodate the shape of the threading guide (8). The recess has a radius of curvature everywhere slightly greater than that of the strand threading guide. This creates a curved passage or guideway through which the strand (2) may be inserted and wrapped about the circumference of the metering rim (6).

In the preferred embodiment, the outer surface of the annular metering rim (6) which comprises the track or raceway described previously is divided into at least two sections through its midplane as illustrated in FIG. 2. The metering surface (21) is of a constant outside diameter. The second surface (22) is beveled inwardly at an angle of anywhere from 0° to 10° from the horizontal, but preferably at about 5°, so as to produce a tapered or conically shaped surface of gradually decreasing diameter. A plurality of slots or apertures (23) are then provided about the circumference of this second beveled surface as illustrated in FIGS. 2, 3 and 4. The slots (23) are generally of about the same width as the rectangular cross-slots (16) cavities cut into the outside surface of the hub (14) but extending only about half their same length.

The pressurized gas or air bearing assembly comprising the hub (14), rim (6), and end cap (19) is positioned inside the front of the housing (24) as shown in FIG. 4 and the other corresponding half (11) is positioned in place. A plurality of conventional threaded fasteners (25) are then used to secure the two halves of the housing together. Another conventional threaded fastener (26) is then inserted through one side of the housing (24) and tightened so as to engage the base of the hub (17) and thereby hold the bearing assembly and attached threading guide (8) securely in place.

In the preferred embodiment, the operation of the assembled apparatus is accomplished by connecting a source of compressed air having a gauge pressure of between 35 and 90 psi to the nozzle (18). Due to the presence of the end cap (19), the air escapes radially outward through the bleed holes (15) in the wall of the annular portion of the hub (14) whereupon it fills the rectangular cavities or cross-slots (16) mentioned previously. This distributes the pressurized air more evenly across the width of the hub as it pushes against the inside surface of the annular metering rim (6). In the preferred embodiment, two rows of eight uniformly spaced bleed holes were used so as to introduce the pressurized air on alternating sides of the 16 corresponding cavities as depicted in FIG. 4.

The pressure of the escaping air supports the rim (6) away from the hub (14) and maintains it in a substantially concentric position about it. The moving strand coming in contact with the rim causes it to rotate with substantially zero friction and in a substantially concentric manner about the hub. Should the rim become displaced from concentric rotation, a restoring force will be generated due to the creation of a small imbalance in the circumferential pressure distribution of the layer of air supporting the rim. This pressure imbalance will increase as the rim is displaced further and further from a concentric position about the hub. As it does, so too will be the restorative force which acts to push the rim back into position. Thus, the combined action of the pressure imbalance and restorative force continually acts to maintain the position of the rim.

As the slots (23) located in the beveled surface of the rim pass directly over the rectangular cross-slots (16) in the hub (14), a short burst of air will pass through the surface (22). This air then sloughs off any broken filaments of strand from the metering rim (16) by casting them away generally in the direction of the taper of the beveled surface (22).

In the preferred embodiment, the bleed holes (15) are very small, typically on the order of 0.018 inches in diameter and the cavities or cross-slots (16) are on the order of about 0.03125 inches wide and deep and about 0.25 inches long. A rim constructed of polyvinyl chloride having a density of approximately 0.04 lb/in$^3$ weighing about 4.3 grams was used. The rim itself had has an inside diameter of 1.750 inches and an outside diameter of 1.820 inches at the constant diameter metering surface (21) which comes in contact with the moving strand (2). Neglecting the effect of the flanges (13) and slots (23), a rim of this size has a moment of inertia about its axis on the order of about $2.0 \times 10^{-6}$ lb-ft-sec$^2$. A strand moving at a typical lineal velocity of between 600 and 700 feet per minute and contacting the rim will cause it to rotate at an angular velocity between 137 and 160 radians per second or roughly 1300 to 1500 rpm.

In order to count the number of revolutions of the rim, there is bonded at one location on the constant diameter metering surface (21) a light reflective target (27) in the shape of a dot or stripe made from a material such as thin aluminum foil. Both a light emitting diode (28a) and phototransistor (28b), the operation of which will be described below, are also contained inside the housing and mounted along with a printed circuit board (29) carrying various electrical components, also described below, by a conventional threaded fastener (30). At least two other conventional threaded fasteners (31) are provided to secure the printed circuit board (29) and its associated electrical components to one-half of the separable housing (24). The housing is of such construction that it is capable of receiving these threaded fasteners at appropriately bored and tapped locations (32). The housing further contains an access hole or port (33) through which to pass a plurality of electrical wires or cables (34) carrying electrical signals used to turn off or on the drive motors of the twist-frame, ply frame, winder, or other powered winding mechanism used to advance the strand.

Light emitted from the diode (28a) is reflected by the target (27) carried on the metering surface (21). This reflected light is then sensed by the phototransistor (28b) whereupon a pulse of electrical current is generated and converted into a voltage once during each revolution of the rim. This voltage is then used to trigger a monostable timing circuit which produces a second voltage pulse having a known magnitude and duration that is compatible with the signal requirements for existing microcomputers.

In the preferred embodiment, the light emitting diode and phototransistor are combined and housed in a single commercially available unit such as Model OPB-703A, manufactured by TRW Corporation. A commercially available timing circuit such as type NE555, manufactured by Signetics Corporation, and a microcomputer such as type 8751H, manufactured by Intel Corporation, may be used although other equivalent components may be substituted to accomplish substantially the same results.

The microcomputer counts the number of voltage pulses which, in turn, correspond to the number of revolutions of the rim. The microcomputer may be further programmed to calculate the total strand length by multiplying this number by the circumference of the metering surface (21). As the rim rotates, these pulses will occur with a periodicity corresponding to the frequency of rotation of the rim.

The microcomputer may also be programmed to activate a relay circuit in order to interrupt any of the powered winding mechanisms described previously once a target count or preset strand length is achieved.

The target count, actual count, and other parameters such as the diameter or circumference of the metering surface may be programmed and transmitted to and from the microcomputer by any commercially available serial communications interface device such as a MAX232 device manufactured by MAXIM Corporation.

Several alternative embodiments of the instant invention have now been disclosed in which certain specific aspects of the apparatus have been described. It should be understood that the instant invention is not limited to the use of any of these specific materials, electrical devices, or dimensions whenever others may be substituted to accomplish substantially the same results in substantially the same manner. Although the preferred embodiment contemplates the use of this apparatus and method for measuring glass fiber strand in a twist-frame environment, it will be understood that it is not limited exclusively thereto. For example, the source for supplying essentially continuous lengths of strand to a take-up reel such as a bobbin or forming package may encompass previously made forming packages of strand or yarn already wound onto bobbins and then re-twisted onto other bobbins by a ply-frame. The source may also be strand drawn and attenuated from either a direct-melt or marble-melt fiber glass bushing assembly. Furthermore, the measuring apparatus described herein may be used with any other type of natural or synthetic strand and is not limited to glass. Therefore, the particular components and applications of the apparatus described herein are not to be interpreted as limiting except; insofar as recited in my accompanying claims.

Accordingly, I claim,

1. In an apparatus for measuring a fixed length of strand as it is advanced from a supply source onto a rotating take-up reel by an appropriately powered winding mechanism operatively connected between said supply source and take-up reel so as to engage said strand and cause it to advance past an annular rotatable metering rim interposed between said supply source and take-up reel, the path of said advancing strand being partially wrapped about the circumference thereof, thereby causing said rim to rotate concentrically about a stationary hub contained within a housing, said hub having means therein for the introduction and exit of a pressurized gas into the annular region formed between said hub and the inner wall of said rim thereby supporting the rim on a layer of pressurized gas about which said rim rotates at substantially the same tangential velocity as said advancing strand and with substantially zero friction, the improvement comprising: a metering rim having a plurality of apertures through the surface thereof to allow said pressurized gas to partially escape from the annular region between said stationary hub and inner wall of said rim whereby any broken filaments of said strand are sloughed off from the surface of said rim.

2. The apparatus of claim 1 the improvement further comprising: a beveled relief surface dividing the outer circumference of said metering rim into two surfaces, the first surface being a metering surface of constant outside diameter and the second surface being beveled radially inward so as to produce a second outer surface of gradually decreasing diameter.

3. The apparatus of claim 2 wherein said apertures are located in the beveled surface of said metering rim.

4. The apparatus of claim 2 wherein said tapered surface is beveled inwardly at an angle of between 0 and 10 degrees as measured from the horizontal.

5. The apparatus of claim 2 wherein said tapered surface is beveled inwardly at an angle of up to at least 5 degrees.

6. The apparatus of claim 3 further including: a first electrical means for detecting, counting, and storing the number of revolutions of said metering rim as it is caused to rotate by said strand.

7. The apparatus of claim 6 further including: a second electrical means for preselecting a number of revolutions and electronically comparing the number of revolutions detected with said preselected value.

8. The apparatus of claim 7 further including: a third electrical means for disengaging said winding mechanism when said preselected number of revolutions are achieved.

9. The apparatus of claim 6 wherein said first electrical means for detecting the number of revolutions includes:
   (a) a light emitting diode;
   (b) a phototransistor; and
   (c) a light reflective target affixed to the metering surface of said metering rim whereby light reflected from the diode and sensed by the phototransistor is converted into an electrical pulse, each pulse representing one revolution of the rim.

10. The apparatus of claim 1 wherein said pressurized gas is pressurized air.

11. The apparatus of claim 1 wherein said appropriately powered winding mechanism is a textile twist-frame, said supply source of strand is a forming package carried on said twist-frame, and said take-up reel is a rotating bobbin also carried on said twist-frame.

12. The apparatus of claim 1 wherein said appropriately powered winding mechanism is an electrically driven rotating winder, said supply source of strand is a fiber glass bushing assembly, and said rotating take-up reel is a forming tube carried on said rotating winder.

13. The apparatus of claim 1 wherein said strand is glass fiber strand having multiple individual filaments thereof.

14. In an apparatus for measuring a fixed length of strand as it is advanced from a supply source onto a rotating take-up reel by an appropriately powered winding mechanism operatively connected between said supply source and take-up reel so as to engage said strand and cause it to advance past an annular rotatable metering rim interposed between said supply source and take-up reel, the path of said advancing strand being partially wrapped about the circumference thereof, thereby causing said rim to rotate concentrically about a stationary hub contained within a housing, said hub having means therein for the introduction and exit of a pressurized gas into the annular region formed between said hub and the inner wall of said rim thereby supporting the rim on a layer of pressurized gas about which said rim rotates at substantially the same tangential velocity as said advancing strand and with substantially zero friction, the improvement comprising: a strand threading guide having generally the shape of a frustum of a right conical shell of revolution, the lower base portion of said threading guide having a smaller diameter than the opposite end thereof, said lower base portion attached to an end cap of sufficient diameter to contain said metering rim between it and the base portion of said stationary hub so as to enable said rim to rotate in a plane generally perpendicular to the axis of said hub.

15. The apparatus of claim 14 further including: a generally curved recess cut within one side of said housing to accommodate the frustum-like shape of said strand threading guide along a partial arc of its major circumference, the radius of said generally curved recess being everywhere greater than that of said threading guide so as to form an opening to allow the placement of strand therein and enable said strand to be partially wrapped about the outer circumference of said metering rim.

16. The apparatus of claim 14 wherein said strand guide and end cap comprise a single component.

17. The apparatus of claim 14 further including: a first electrical means for detecting, counting, and storing the number of revolutions of said metering rim as it is caused to rotate by said strand.

18. The apparatus of claim 17 further including: a second electrical means for preselecting a number of revolutions and electronically comparing the number of revolutions detected with said preselected value.

19. The apparatus of claim 18 further including: a third electrical means for disengaging said winding mechanism when said preselected number of revolutions are achieved.

20. The apparatus of claim 17 wherein said first electrical means for detecting the number of revolutions includes:
 (a) a light emitting diode;
 (b) a phototransistor; and
 (c) a light reflective target affixed to the metering surface of said metering rim whereby light reflected from the diode and sensed by the phototransistor is converted into an electrical pulse, each pulse representing one revolution of the rim.

21. The apparatus of claim 14 wherein said pressurized gas is pressurized air.

22. The apparatus of claim 14 wherein said appropriately powered winding mechanism is a textile twist-frame, said supply source of strand is a forming package carried on said twist-frame, and said take-up reel is a rotating bobbin also carried on said twist-frame.

23. The apparatus of claim 14 wherein said appropriately powered winding mechanism is an electrically driven rotating winder, said supply source of strand is a fiber glass bushing assembly, and said rotating take-up reel is a forming tube carried on said rotating winder.

24. The apparatus of claim 14 wherein said strand is glass fiber strand having multiple individual filaments thereof.

25. In a method for measuring a fixed length of strand including the steps of interposing a measuring device between a supply source of said strand and an appropriately powered winding mechanism whereby said strand is advanced from said supply source past said measuring device and onto a rotating take-up reel, the advancing strand contacted against the outside surface of a rotatable metering rim by partially wrapping it thereon, said metering rim being concentrically positioned about a stationary hub and supported by a layer of pressured gas so as to enable the substantially frictionless rotation of said rim about said hub at substantially the same tangential velocity as said advancing strand, the improvement comprising the step of: allowing a portion of said pressurized gas to escape through the surface of said metering rim by means of a plurality of apertures in the wall thereof whereby any broken filaments of said strand are sloughed off and away from the surface of said rim.

26. The method of claim 25 further including electro-optical means for detecting, counting and storing the number of revolutions of said metering rim.

27. The method of claim 25 wherein said pressurized gas is pressurized air.

28. The method of claim 25 wherein said appropriately powered winding mechanism is a textile twist-frame, said supply source of strand is a forming package carried on said twist-frame, and said take-up reel is a rotating bobbin also carried on said twist-frame.

29. The method of claim 25 wherein said appropriately powered winding mechanism is an electrically driven rotating winder, said supply source of strand is a fiber glass bushing assembly, and said rotating take-up reel is a forming tube carried on said rotating winder.

30. The method of claim 25 wherein said strand is glass fiber strand having multiple individual filaments thereof.

* * * * *